Patented June 14, 1949

2,473,134

UNITED STATES PATENT OFFICE 2,473,134

ADJUSTABLE ROTOR BLADE

Horace W. Bonnett, Fairfield, Conn., assignor to United Aircraft Corporation, East Hartford, Conn., a corporation of Delaware Application November 9, 1945, Serial No. 627,754

3 Claims. (Cl. 170—159)

This invention relates to rotor blades for rotary wing aircraft, and more particularly to blades that are easily adjusted without disassembly, and including a formable, or pliable, part that can be formed during and after blade assembly to adjust the blade for aerodynamic pitching moments in a blade, a portion of a blade, and balance one blade with one or more other blades (as regards the pitching moments thereof, or the tendency of a blade to increase or decrease its angle of incidence due to aerodynamic action in flight) to provide improved operation for sets of rotor blades.

The invention is particularly adapted for use with a gauging and bending tool such as disclosed in the co-pending application of Reon B. Roberts, U. S. appl. Ser. No. 588,816 filed April 17, 1945, now Patent No. 2,422,042 dated June 10, 1947; but is capable of use with other devices, as will be clear from the following specification.

In blades for rotary wing aircraft; due to variables affecting the assembly operation such as different temperatures, humidities, mechanic's tolerances, and the like, as well as because different materials, and different parts of the same material age differently and vary slightly in size and shape; and because the aerodynamic characteristics of a blade are exceedingly sensitive to very small irregularities; it has been found desirable, or necessary, to adjust blades individually and collectively to perform to a predetermined standard as regards the pitching moment. These adjustments are best made in the field after the blade has been used, and corrective adjustments are required from time to time.

Some blades have been provided with external tabs of metal which may be bent or formed to correct this pitching moment; but only with an appreciable sacrifice in power due to drag of an exposed part on a high speed airfoil. Still others have been provided with aileron sections that may be adjusted; but these can only correct small portions of a blade adjacent such sections, and are difficult to build and subject to structural failure because of a multiplicity of cooperating parts.

Accordingly, it is an object of this invention to provide an improved and simplified sturdy structure for adjusting the aerodynamic pitching moment of a rotor blade having little, if any, drag losses, and capable of differentially adjusting an entire blade, or any part or parts thereof, either in the factory or in the field.

Other objects reside in the details of construction of an adjustable rotor blade, the combination of elements thereof, and will be either obvious or pointed out in the following specification and claims, in view of the accompanying drawing, in which:

Figure 1:
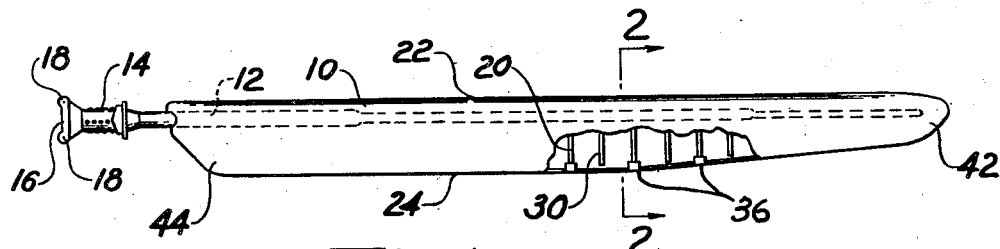
Fig. 1 is a plan view of a rotor blade made in accordance with this invention.
Figure 2:
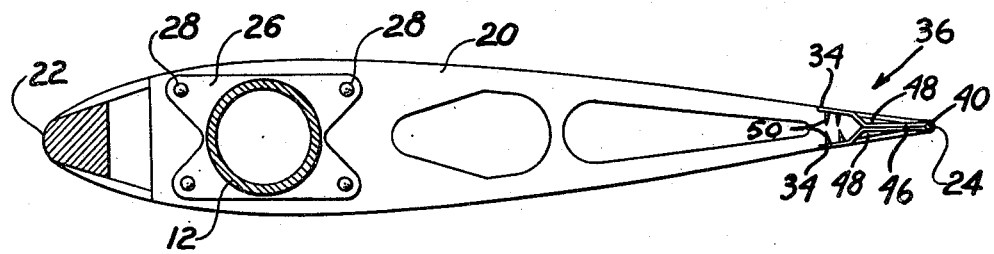
Fig. 2 is a section taken along the lines 2—2 of Fig. 1.
Figure 3:
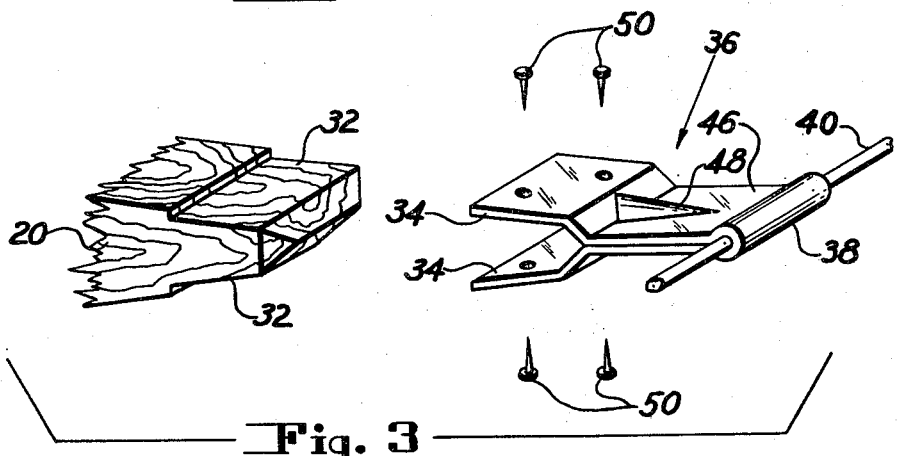
Fig. 3 is an exploded detail perspective view of the trailing edge structure of this invention.

Referring now to Fig. 1, a rotor blade 10 is supported by a spar 12 as its main longitudinal element, which spar may be of the tapered cylindrical type made of steel to provide strength. The spar 12 has a supporting cuff 14 at its root end which is expanded into a mounting bracket 16 provided with ears 18 that mate with a corresponding bracket carried by the rotor head structure, not shown, of a helicopter or the like. The spar 12 supports ribs 20 which support and extend from the leading edge 22 to the trailing edge 24 of the blade, and which are secured to the spar 12 by collars 26 that may be bolted or otherwise secured to the spar, and are shown as secured by rivets 28 to the rib 20. The spar 12 also supports filler ribs 30 which may extend to the leading edge 22 of the blade, but which do not extend to the trailing edge 24 where less support is required to permit ready adjustment of the entire blade in a manner to be described below.

The ribs 20 may be built up of plywood or other suitable material and at their trailing ends are provided with shoulders 32 which mate with flanged mounting surfaces 34 of a formable trailing tab generally indicated by the reference character 36. In addition to the extended surfaces 34, the trailing edge tab provides a cylindrically shaped bend 38 for supporting a trailing edge cable 40 that is retained in tension between the several spars 20 by the tip 42 and root 44 of the blade. The member 36 is made up of a strip of metal that is folded to form the cylindrical bend 38 in its middle and is pressed to form a spacer section 46 having strengthening ribs 48 to provide a light weight structure with sufficient strength to hold the shape into which it may be bent. The surfaces 34 are moved into engagement with the shoulders 32 and staples 50 or the like may be used to secure the parts together.

When the blade is assembled with the present rib structure provided with the formable member 36, the blade can be measured by the use of a tool such as shown in the above-mentioned Robert's application (or by other known tools for measuring airfoil sections) and the members 36 bent so that the surface of the blade 10 will have the proper shape. Thereafter, the blade may be operated upon a helicopter or the like and the action of the blade during operation measured by known means. In the event that aerodynamic actions are such as to cause erratic or improper blade operation, the members 36 can be formed to correct such operation.

Figure 4:
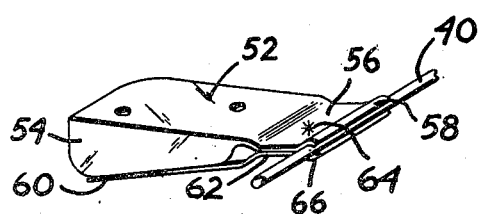
Fig. 4 is a perspective view of a modification.

In Fig. 4, a modification of the tab for supporting the cable is shown. An upper plate 52 has a depending strengthening flange 54 and an offset extension 56 at its rear providing a curved segment 58 for supporting the cable 40. A lower plate 60 has an extended portion 62 spot welded as at 64 to the extension 56 and having a curved portion 66 for cooperating with the portion 58 in supporting the cable 40. The portions 56 and 62 can be bent by the use of a bending tool to shape the trailing edge of the blade.

The present invention, as constructed and arranged, provides means for proper adjustment of blades when in the process of manufacture, and also permits of ready adjustment of single blades, parts of blades, and the several blades to each other away from the factory. The pliable members 36 are capable of being bent by many simple tools such as wrenches or pliers with proper surfaces for engaging the fabric or other covering of the blades 10 to further enhance the value of a blade constructed in keeping with this invention.

While I have shown and described one presently preferred form of my invention, obviously many other modifications will occur to those skilled in the art. For this reason, I wish not to be limited in my invention only to that specific form shown and described but by the scope of the following claims.

I claim:
1. A rotor blade comprising, in combination, a spar, transverse ribs for shaping the blade secured to said spar, a leading edge forming member secured to said ribs for forming the leading edge of the blade, a trailing edge forming cable, and pliable cable supporting means extended aft of the extremities of said ribs having forward rib attaching portions and aft cable attaching portions for securing said cable in chordwise spaced relation to the aft extremities of said ribs and for providing an adjustment for the trailing edge of the blade and having chordwise strengthening ribs extending between the aft extremities of said ribs and said cable.

2. A rotor blade comprising, in combination, a spar, a plurality of main chordwise ribs carried by said spar, a flexible cover for the blade supported by said ribs, adjustable means carried by said ribs forming the trailing edge of the blade comprising, a trailing edge cable, and a plurality of cable supporting elements carried by the trailing portions of said ribs in spanwise spaced relation along the trailing edge of said blade, each of said elements including a forward rib receiving portion for attaching it to a rib, an aft cable supporting portion and an intermediate pliable portion of sufficient chordwise length to locate said cable in spaced relation aft of the extremity of said ribs, and a plurality of intermediate ribs carried by said spar between said main ribs supporting said blade cover and terminating at their aft extremities forward of said cable.

3. A rotor blade comprising a flexible spar, a plurality of chordwise ribs carried by said spar at spaced points along the span thereof, a flexible cover for the blade supported by said ribs, and a trailing edge structure for said blade forming a continuous uniform trailing edge which is flexible fore and aft in the chordwise plane of the blade and pliable up and down out of said plane, said structure including a plurality of spanwise spaced trailing edge tabs, one of which is attached to the aft extremity of each rib, each of said tabs including a recess portion adapted to receive the extremity of a rib and an integral pliable portion extended a substantial distance aft of said recess portion and terminating in a spanwise cable receiving portion which is displaceable above or below said chordwise plane independently of the position of like portions of adjacent tabs by bending said pliable portion, and a trailing edge cable within said flexible cover extending from the root to the tip of said blade and supported at spaced points along its length by said cable receiving portions of said tabs and forming a continuous flexible support for said cover along the trailing edge of the blade.

HORACE W. BONNETT.

REFERENCES CITED

The following references are of record in the file of this patent:

UNITED STATES PATENTS

| Number | Name | Date |
|---|---|---|
| 998,978 | Norris | July 25, 1911 |
| 1,990,291 | Larsen | Feb. 5, 1935 |
| 2,420,174 | Hunt | May 6, 1947 |